US010841792B2

(12) United States Patent
Zhu et al.

(10) Patent No.: US 10,841,792 B2
(45) Date of Patent: Nov. 17, 2020

(54) NETWORK CONNECTION METHOD, METHOD FOR DETERMINING SECURITY NODE, AND APPARATUS

(71) Applicant: Huawei Technologies Co., Ltd., Shenzhen (CN)

(72) Inventors: Hualin Zhu, Shanghai (CN); He Li, Shanghai (CN); Weisheng Jin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 92 days.

(21) Appl. No.: 16/206,497

(22) Filed: Nov. 30, 2018

(65) Prior Publication Data

US 2019/0110194 A1 Apr. 11, 2019

Related U.S. Application Data

(63) Continuation of application No. PCT/CN2016/084385, filed on Jun. 1, 2016.

(51) Int. Cl.
*H04W 12/02* (2009.01)
*H04W 76/10* (2018.01)
(Continued)

(52) U.S. Cl.
CPC ............ *H04W 12/02* (2013.01); *H04L 9/088* (2013.01); *H04L 61/203* (2013.01);
(Continued)

(58) Field of Classification Search
CPC ..... H04W 76/10; H04W 60/00; H04W 12/04; H04W 12/02; H04W 12/001;
(Continued)

(56) References Cited

U.S. PATENT DOCUMENTS

2003/0147537 A1* 8/2003 Jing ................... H04L 63/0442
380/277
2006/0078119 A1 4/2006 Jee et al.
(Continued)

FOREIGN PATENT DOCUMENTS

| CN | 101448245 A | 6/2009 |
| CN | 102695168 A | 9/2012 |

(Continued)

OTHER PUBLICATIONS

NPL Search Result (Year: 2020).*

(Continued)

*Primary Examiner* — Syed A Zaidi
(74) *Attorney, Agent, or Firm* — Hauptman Ham, LLP

(57) ABSTRACT

Embodiments of this application relate to the field of communications technologies, and provide a network connection method and an apparatus. The method carried out by a network control element includes: sending a first connection parameter to a terminal, and sending a second connection parameter to a security node, so that a network connection between the terminal and the security node is established by using the first connection parameter and the second connection parameter, where the first connection parameter is used for decrypting data encrypted by using the second connection parameter, correspondingly, the second connection parameter is used for decrypting data encrypted by using the first connection parameter, and the first connection parameter and the second connection parameter each include a security parameter used when the terminal and the security node establish the network connection.

16 Claims, 6 Drawing Sheets

(51) Int. Cl.
    *H04W 36/00*     (2009.01)
    *H04L 29/12*     (2006.01)
    *H04L 29/06*     (2006.01)
    *H04W 12/04*     (2009.01)
    *H04W 60/00*     (2009.01)
    *H04W 4/02*     (2018.01)
    *H04W 12/00*     (2009.01)
    *H04L 9/08*     (2006.01)

(52) U.S. Cl.
    CPC ........ *H04L 63/0428* (2013.01); *H04L 63/062* (2013.01); *H04W 4/023* (2013.01); *H04W 12/001* (2019.01); *H04W 12/0013* (2019.01); *H04W 12/0017* (2019.01); *H04W 12/0403* (2019.01); *H04W 36/0038* (2013.01); *H04W 60/00* (2013.01); *H04W 76/10* (2018.02); *H04L 63/0892* (2013.01); *H04W 36/0011* (2013.01)

(58) Field of Classification Search
    CPC ............... H04W 12/403; H04W 4/023; H04W 36/0011; H04W 36/0038; H04L 63/0428; H04L 63/062; H04L 61/203; H04L 9/088
    USPC ........................................................ 713/171
    See application file for complete search history.

(56) References Cited

U.S. PATENT DOCUMENTS

2006/0276226 A1* 12/2006 Jiang ..................... H04W 8/183
    455/558
2007/0230453 A1 10/2007 Giaretta et al.
2009/0047947 A1* 2/2009 Giaretta ................ H04W 48/17
    455/432.1
2009/0285179 A1* 11/2009 Jones .................... H04W 28/08
    370/331
2010/0124228 A1* 5/2010 Tinnakornsrisuphap ..................
    H04L 12/66
    370/392
2010/0125899 A1* 5/2010 Tinnakornsrisuphap ..................
    H04L 63/10
    726/12
2012/0113959 A1* 5/2012 Sugizaki ........... H04W 36/0016
    370/331
2013/0279406 A1* 10/2013 Merino Vazquez ........................
    H04L 65/1073
    370/328
2014/0177583 A1* 6/2014 Aso ........................ H04W 4/70
    370/329

FOREIGN PATENT DOCUMENTS

CN     102752833 A     10/2012
CN     104796887 A     7/2015
WO     2016069638 A2     5/2016

OTHER PUBLICATIONS

NPL Search Results (Year: 2020).*
S. Kent et al., "Security Architecture for the Internet Protocol", Network Working Group, Nov. 1998, 66 pages.
D. Harkins et al., "The Internet Key Exchange (IKE)", Network Working Group, Nov. 1998, 42 pages.

* cited by examiner

NETWORK CONNECTION METHOD, METHOD FOR DETERMINING SECURITY NODE, AND APPARATUS

CROSS-REFERENCE TO RELATED APPLICATIONS

This application is a continuation of International Patent Application No. PCT/CN2016/084385 filed on Jun. 1, 2016. The disclosure of the aforementioned application is hereby incorporated by reference in the entity.

TECHNICAL FIELD

This application relates to the field of communications technologies, and in particular, to a network connection method, a method for determining a security node, and an apparatus.

BACKGROUND

With rapid development of communications technologies, more terminals emerge, for example, mobile phones, tablet computers, notebook computers, and computers. These terminals may establish network connections to a network element device deployed by an operator in a public network, to transmit data by using the network connections. However, data may be easily intercepted by some lawbreakers in a transmission process. Consequently, a data leakage is caused, and even severe losses are caused to users.

Currently, to ensure transparency of data in a transmission process, a secure network connection usually needs to be established between a terminal and a network element device. The transparency means that the data is invisible to an intermediate node in a transmission path. In a process of establishing the network connection, the terminal first needs to be associated with the network element device to which the network connection is established. Next, the terminal and the network element device need to perform signaling interaction for multiple times, and negotiate a security parameter, to determine a security parameter of the network connection. The security parameter includes a key, an encryption algorithm, a service life, and the like. Finally, the terminal and the network element device perform authentication, for example, may perform authentication by using a method for encrypting a random number. Security of the established network connection cannot be ensured until the authentication is passed.

In the foregoing method for establishing a secure network connection, the network connection is established between the terminal and the network element device through negotiation between the two parties. To be specific, the security network connection can be established between the terminal and the network element device only after the terminal and the network element device perform complex signal interaction for multiple times. Consequently, a process of establishing the network connection is relatively complex.

SUMMARY

Embodiments of this application provide a network connection method, a method for determining a security node, and an apparatus, to resolve a problem in the prior art that a network connection establishment process is relatively complex.

To achieve the foregoing objective, the following technical solutions are used in the embodiments of this application.

According to a first aspect, a network connection method is provided. The method includes: sending, by a network control element, a first connection parameter to a terminal; and sending, by the network control element, a second connection parameter to a security node, where the first connection parameter is used for decrypting data encrypted by using the second connection parameter, correspondingly, the second connection parameter is used for decrypting data encrypted by using the first connection parameter, and the first connection parameter and the second connection parameter each include a security parameter used when the terminal and the security node establish a network connection.

According to a second aspect, a network connection method is provided. The method includes: receiving, by a terminal, a first connection parameter that is sent by a network control element and that includes a security parameter used when the terminal establishes a network connection to a security node, where first connection parameter is used for decrypting data encrypted by using a second connection parameter; and establishing, by the terminal by using the first connection parameter, the network connection to the security node receiving the second connection parameter.

According to a third aspect, a network connection method is provided. The method includes: receiving, by a security node, a second connection parameter that is sent by a network control element and that includes a security parameter used when the security node establishes a network connection to a terminal, where second connection parameter is used for decrypting data encrypted by using a first connection parameter; and establishing, by the security node by using the second connection parameter, the network connection to the terminal receiving the first connection parameter.

In the foregoing technical solutions, the network control element assigns the first connection parameter to the terminal, and assigns the second connection parameter to the security node, so that the terminal and the security node establish a secure network connection directly by using the first connection parameter and the second connection parameter. Therefore, the terminal and the security node do not need to perform complex signaling interaction for negotiation, thereby simplifying a network connection process.

Optionally, based on the first aspect, if the security node is an independent network element, the method further includes: obtaining, by the network control element, subscription data corresponding to the terminal; and sending, by the network control element, a first connection request including a part or all of content of the subscription data to the security node, where the first connection request is used for enabling the security node to send a second connection request including a part or all of content of the subscription data to a gateway device, and the second connection request is used for establishing a connection between the security node and the gateway device.

Optionally, according to the first aspect, a first response message includes an IP address assigned by the gateway device to the terminal.

Optionally, according to the first aspect, the method further includes: receiving, by the network control element, the first response message sent by the security node, where the first response message includes an IP address of the terminal; and sending, by the network control element, the IP address of the terminal to the terminal.

Correspondingly, optionally, based on the first aspect, the method further includes: receiving, by the terminal, the IP address of the terminal sent by the network control element.

Correspondingly, optionally, based on the third aspect, if the security node is an independent network element, the method further includes: receiving, by the security node, a first connection request that is sent by the network control element and that includes a part or all of content of subscription data; and sending, by the security node, a second connection request including a part or all of content of the subscription data to a gateway device, where the second connection request is used for establishing a connection between the security node and the gateway device.

Optionally, according to the third aspect, the method further includes: receiving, by the security node, a second response message sent by the gateway device, where the second response message includes an IP address assigned by the gateway device to the terminal.

Optionally, according to the third aspect, the method further includes: sending, by the security node, a first response message to the network control element, where the first response message includes the IP address assigned to the terminal, to enable the network control element to send the IP address of the terminal to the terminal.

In the foregoing optional technical solutions, if the security node can directly communicate with the gateway device, the security node may directly send a connection request to the gateway device, to establish the connection between the security node and the gateway device, and also send, to the terminal through the network control element, the IP address assigned by the gateway device to the terminal, thereby completing configuration of the IP address of the terminal.

Optionally, based on the first aspect, if the security node is an independent network element, the method further includes: obtaining, by the network control element, subscription data corresponding to the terminal; and when receiving a third connection request sent by the security node to the gateway device through the network control element, sending, by the network control element, a fourth connection request to the gateway device, where the fourth connection request includes a part or all of content of the subscription data, and the third connection request and the fourth connection request are used for establishing a connection between the security node and the gateway device.

Optionally, according to the first aspect, the method further includes: when receiving a fourth response message sent by the gateway device to the security node through the network control element, sending, by the network control element, a third response message to the security node, where the third response message includes a part or all of content of the subscription data, to establish the connection between the security node and the gateway device.

Optionally, according to the first aspect, the fourth response message includes an IP address assigned by the gateway device to the terminal; and correspondingly, the method further includes: sending, by the network control element, the IP address of the terminal to the terminal.

Correspondingly, optionally, based on the second aspect, the method further includes: receiving, by the terminal, the IP address of the terminal sent by the network control element.

Correspondingly, optionally, based on the third aspect, if the security node is an independent network element, the method further includes: sending, by the security node, a third connection request to the network control element, where the third connection request is used for establishing a connection between the security node and the gateway device.

Optionally, according to the third aspect, the method further includes: receiving, by the security node, a third response message sent by the network control element, to establish the connection between the security node and the gateway device, where the third response message includes a part or all of content of the subscription data.

Optionally, according to the third aspect, the third response message includes an IP address assigned by the gateway device to the terminal.

In the foregoing technical solutions, if control plane communication cannot be directly performed between the security node and the gateway device, the security node may communicate with the gateway device through the network control element, to establish the connection between the security node and the gateway device, and also send, to the terminal through the network control element, the IP address assigned by the gateway device to the terminal, thereby completing configuration of the IP address of the terminal.

Optionally, based on the first aspect, if the security node is an independent network element, the method further includes: obtaining, by the network control element, subscription data corresponding to the terminal; sending, by the network control element, a fifth connection request including a part or all of content of the subscription data to the gateway device, where the fifth connection request is used for establishing a connection between the security node and the gateway device; and receiving, by the network control element, a fifth response message returned by the gateway device.

Optionally, according to the first aspect, the method further includes: sending, by the network control element, a sixth connection request including a part or all of content of the subscription data to the security node, to establish a connection between the security node and the gateway device.

Optionally, according to the first aspect, the third response message includes an IP address assigned by the gateway device to the terminal; and correspondingly, the method further includes: sending, by the network control element, the IP address of the terminal to the terminal.

Correspondingly, optionally, based on the second aspect, the method further includes: receiving, by the terminal, the IP address of the terminal sent by the network control element.

Correspondingly, optionally, based on the third aspect, if the security node is an independent network element, the method further includes: receiving, by the security node, a sixth connection request that is sent by the network control element and that includes a part or all of content of subscription data, to establish a connection between the security node and the gateway device, where the sixth connection request includes a part or all of content of the subscription data and is used for requesting to establish the connection between the security node and the gateway device.

Optionally, according to the third aspect, the sixth connection request includes an IP address assigned by the gateway device to the terminal.

In the foregoing technical solutions, if control plane communication cannot be directly performed between the security node and the gateway device, the network control element may send a connection request to the gateway device, and the security node may communicate with the gateway device through the network control element, to establish the connection between the security node and the gateway device, and also send, to the terminal through the network control element, the IP address assigned by the gateway device to the terminal, thereby completing configuration of the IP address of the terminal.

Correspondingly, optionally, based on the first aspect, before the sending, by a network control element, a first connection parameter to a terminal, the method further includes: determining, by the network control element, a node identifier of the security node; and sending, by the network control element, the node identifier of the security node to the terminal.

Optionally, based on the first aspect, before the sending, by a network control element, a first connection parameter to a terminal, the method further includes: receiving, by the network control element, an attach request or a connection request sent by the terminal, where the attach request or the connection request is used for requesting to establish a PDN connection.

Correspondingly, optionally, based on the second aspect, before the receiving, by the terminal, a first connection parameter that is sent by a network control element, the method further includes: receiving, by the terminal, a node identifier of the security node sent by the network control element; and determining, by the terminal, the security node based on the node identifier of the security node.

Optionally, based on the second aspect, before the terminal receives, in an attach process or a connection establishment process, the first connection parameter sent by the network control element, the method further includes: sending, by the terminal, the attach request or the connection request to the network control element, where the attach request or the connection request is used for requesting to establish the PDN connection.

In the foregoing optional solutions, in a manner in which the terminal sends the attach request or the connection request used for requesting to establish the PDN connection to the network control element, the network control element is triggered to perform the network connection, and the security node to which the terminal establishes the network connection is determined based on the node identifier of the security node determined by the network control element, so that the network connection is effectively established based on a requirement of the terminal, and a success rate of establishing the network connection is increased.

Optionally, according to any one of the first aspect to the third aspect, the first connection parameter includes at least one of the following: a first security key, a security encryption algorithm, a randomizer, and a security index; and the second connection parameter includes at least one of the following: a second security key, the security encryption algorithm, the randomizer, and the security index.

The first security key is used by the terminal to encrypt sent data or decrypt received data, or is used for generating a new security key of the terminal; the security encryption algorithm is an algorithm used by the terminal or the security node to encrypt or decrypt data; the randomizer is used for generating a new security key; the security index is used for identifying a secure connection corresponding to a data packet; and the second security key is used by the security node to encrypt sent data or decrypt received data, or is used for generating a new security key of the security node.

In the foregoing optional solutions, the sent data or received data is encrypted and decrypted by using the first connection parameter and the second connection parameter. This can ensure that transmitted data is invisible to an intermediate node, thereby ensuring security of the transmitted data.

Optionally, according to any one of the first aspect to the third aspect, the network control element is a mobility management entity or an authentication, authorization, and accounting server.

When the network control element is a mobility management entity, a local network has a more close relationship with a carrier network, and an operator can control operation of the local network better. When the network control element is an authentication, authorization, and accounting server, a local network has a less close relationship with a carrier network, and deployment of the local network is more flexible.

Optionally, according to any one of the first aspect to the third aspect, the security node is an independent network element, or a network element integrated and deployed with the gateway device, or a network element integrated and deployed a mobile edge computing device.

When the security node is an independent network element, network device functions are more modularized, and a structure is clearer, but transport signaling between devices is increased. On the contrary, when the security node and the gateway device are integrated and deployed, network device functions are complex and diversified, but transport signaling between devices is reduced.

In addition, in a method for establishing a secure network connection in the prior art, a network element device, namely, a security node, is selected by the terminal, but the terminal has no sufficient information. Therefore, a situation in which an inappropriate security node is selected exists. For this problem, this application further provides a method for determining a security node.

According to a fourth aspect, a method for determining a security node is provided. The method includes: determining, by a network control element in an attach process or a connection establishment process, a node identifier of a security node based on home domain information of a terminal, and/or location information of the terminal, and/or location information of a local network in which the terminal is located; and sending, by the network control element, the node identifier of the security node to the terminal, so that the terminal determines the security node based on the node identifier of the security node.

Optionally, according to the fourth aspect, the determining, by the network control element, a node identifier of the security node includes: selecting, by the network control element, one security node from a plurality of security nodes based on the home domain information of the terminal, and/or the location information of the terminal, and/or the location information of the local network in which the terminal is located, and determining an identifier of the selected security node as the node identifier of the security node.

According to a fifth aspect, a method for determining a security node is provided. The method further includes: receiving, by a terminal, a node identifier of the security node sent by a network control element; and determining, by the terminal, the security node based on the node identifier of the security node.

In the foregoing technical solution, the network control element selects a security node that is relatively close to a user based on the home domain information of the terminal, the location information of the terminal, the location information of the local network, and the like, so that paths for control plane signaling and user plane transmission can be effectively reduced, thereby reducing a transmission delay.

Optionally, based on the fourth aspect, the home domain information of the terminal is home domain information determined by using a home domain identity of the terminal, and the home domain identity is an international mobile subscriber identity IMSI, or a globally unique temporary identity GUTI, or a subscriber identity SI; the location information of the terminal is longitude and latitude information of the terminal, or coordinate information, or an identifier and/or location information of an access network accessed by the terminal; and the location information of the local network is an identifier and/or location information of a management network element or an access network in the local network.

Optionally, according to the fourth aspect, the method further includes: receiving, by the network control element, the home domain identity of the terminal, or determining, by the network control element, the home domain identity of the terminal based on a received identifier of the terminal in the local network; and/or receiving, by the network control element, the location information of the terminal, or determining, by the network control element, the location information of the terminal based on a received message of the access network; and/or, receiving, by the network control element, the location information of the local network, or determining, by the network control element, the location information of the local network based on a received message of the local network.

Correspondingly, optionally, based on the fifth aspect, the method further includes: sending, by the terminal, an attach request or a connection request to the network control element, where the attach request or the connection request includes location information of the terminal, where the location information of the terminal is longitude and latitude information of the terminal, or coordinate information, or an identifier or location information of an access network accessed by the terminal.

In the foregoing optional solutions, the home domain information of the terminal may be determined by using a plurality of different home domain identities, the location information of the terminal and the location information of the local network may be represented in a plurality of different manners, and the network control element may obtain the home domain information and the location information of the terminal and the location information of the local network by using a plurality of different methods, thereby enriching implementation methods of the network control element and also increasing accuracy in selecting the security node.

According to a sixth aspect, a network control element is provided. The network control element includes a memory and a processor, where the memory stores code and data, the processor can run the code in the memory, and the processor is configured to perform the network connection method according to the first aspect or the method for determining a security node according to the fourth aspect.

According to a seventh aspect, a terminal is provided. The terminal includes a memory and a processor, where the memory stores code and data, the processor can run the code in the memory, and the processor is configured to perform the network connection method according to the second aspect or the method for determining a security node according to the fifth aspect.

According to an eighth aspect, a security node is provided. The security node includes a memory and a processor, where the memory stores code and data, the processor can run the code in the memory, and the processor is configured to perform the network connection method according to the third aspect.

According to a ninth aspect, a communications system is provided. The communications system includes the network control element according to the sixth aspect, the terminal according to the seventh aspect, and the security node according to the eighth aspect.

BRIEF DESCRIPTION OF THE DRAWINGS

To describe the technical solutions in the embodiments of this application more clearly, the following briefly describes the accompanying drawings required in the embodiments. Apparently, the accompanying drawings in the following description show merely some embodiments of this application, and persons of ordinary skill in the art may derive other drawings from these accompanying drawings without creative efforts.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

Figure 1:
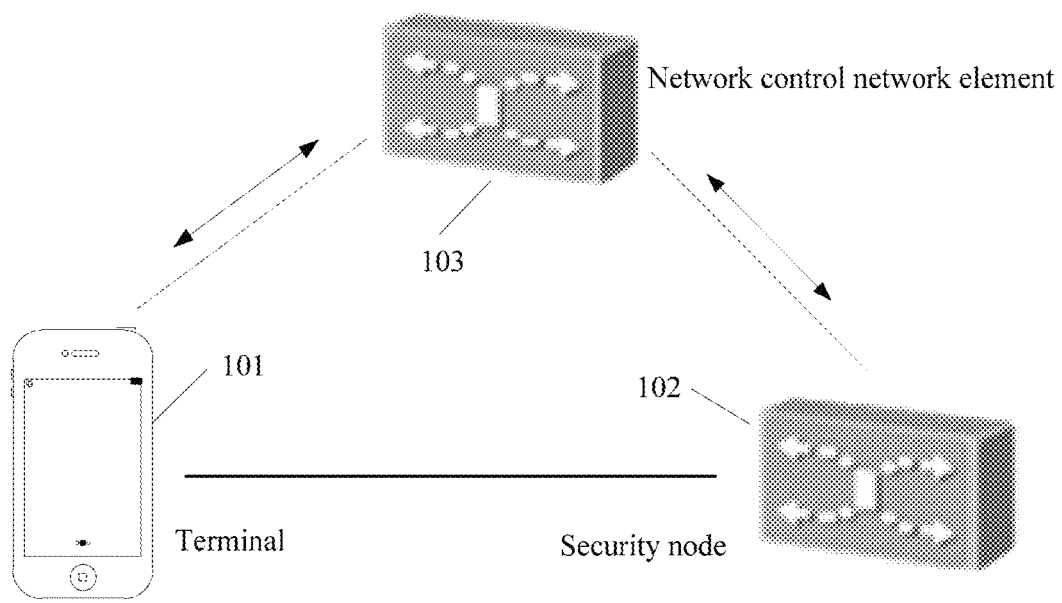
FIG. 1 is a schematic structural diagram of a network architecture according to an embodiment of this application.

FIG. 1 is a schematic structural diagram of a network architecture according to an embodiment of this application. As shown in FIG. 1, the network architecture includes a terminal 101, a security node 102, and a network control element 103. The terminal 101 may be a mobile phone, a tablet computer, a notebook computer, a computer, a netbook, or the like. This figure is described by using an example in which the terminal 101 is a mobile phone. Data may be transmitted between the terminal 101 and the security node 102. In this embodiment of this application, the security node 102 is configured to establish a secure network connection to the terminal 101. Data that is transmitted by using the secure network connection is invisible to an intermediate node, thereby ensuring security of user data. The network control element 103 is configured to manage and control another network element deployed in a network. For example, the network control element 103 may be configured to manage or control the terminal 101 and the security node 102. In addition, the network control element 103 may be different network element devices in different types of networks.

The network architecture used in this application is described in detail below by using a mobile network as an example.

Figure 1A:
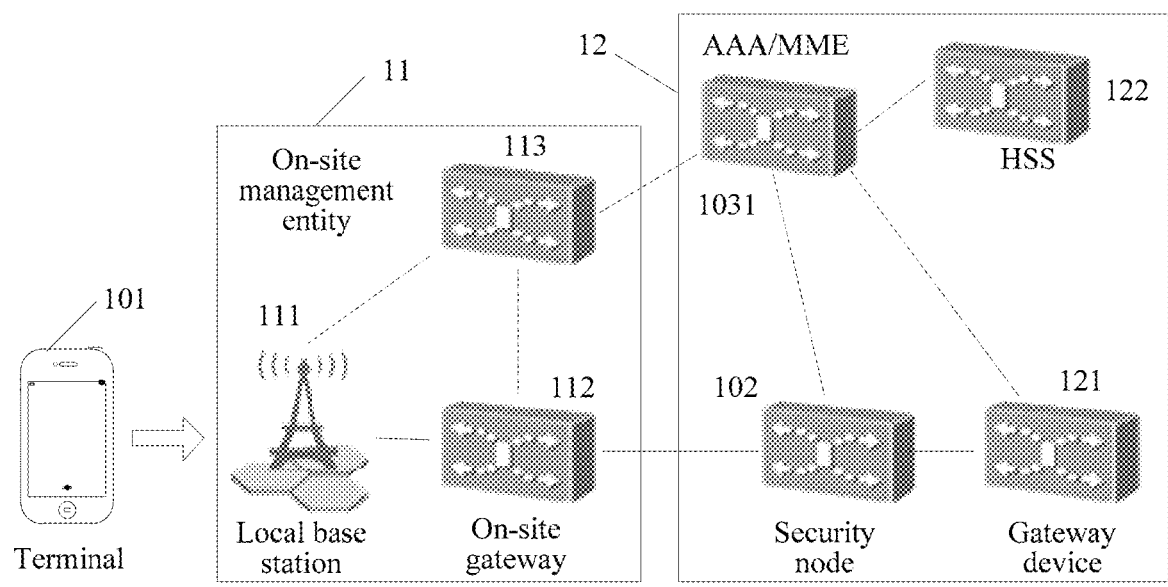
FIG. 1a is a schematic structural diagram of another network architecture according to an embodiment of this application.

Specifically, FIG. 1a shows a network architecture of Second Access Long Term Evolution (SALTE) in a mobile network. Referring to FIG. 1a, the network architecture mainly includes three parts, which are a terminal 101, a network element 11 of a local network, and a network element 12 of a public network. The network element 11 of the local network is a locally deployed network element device, may be deployed by an enterprise, a third-party organization, or an operator, and mainly includes a local base station 111, a local gateway (On-site Gateway, On-site GW) 112 and an local mobility management entity (on-site Mobility Management Entity, on-site MME) 113. The local GW 112 and the local MME 113 are core network parts included in the local network. The network element 12 of the public network is a network element device deployed by an operator, and mainly includes a security node 102, an authentication, authorization, and accounting server or mobility management entity (AAA/MME) 1031, a gateway device 121, and a home subscriber server (HSS) 122.

In the network architecture in FIG. 1a, the local base station 111 is an access device, that is, a device for the terminal 101 to access the local network. The local GW 112 is a gateway device, and is configured to transmit user data. The local MME 113 is mainly responsible for access management, session management, mobility management, and the like inside the local network. The AAA/MME 1031 is a network control element 103 in the network architecture. In addition to management and control of a network element in a network, the AAA/MME 1031 is further mainly responsible for authentication, service authorization, and the like for a user. The HHS 122 is mainly responsible for storing subscription data of a user. The gateway 121 is a gateway of the mobile network, and is an anchor of data transmission of a user. Optionally, the gateway 121 and the security node 102 are integrated and deployed into a network element.

Figure 1B:
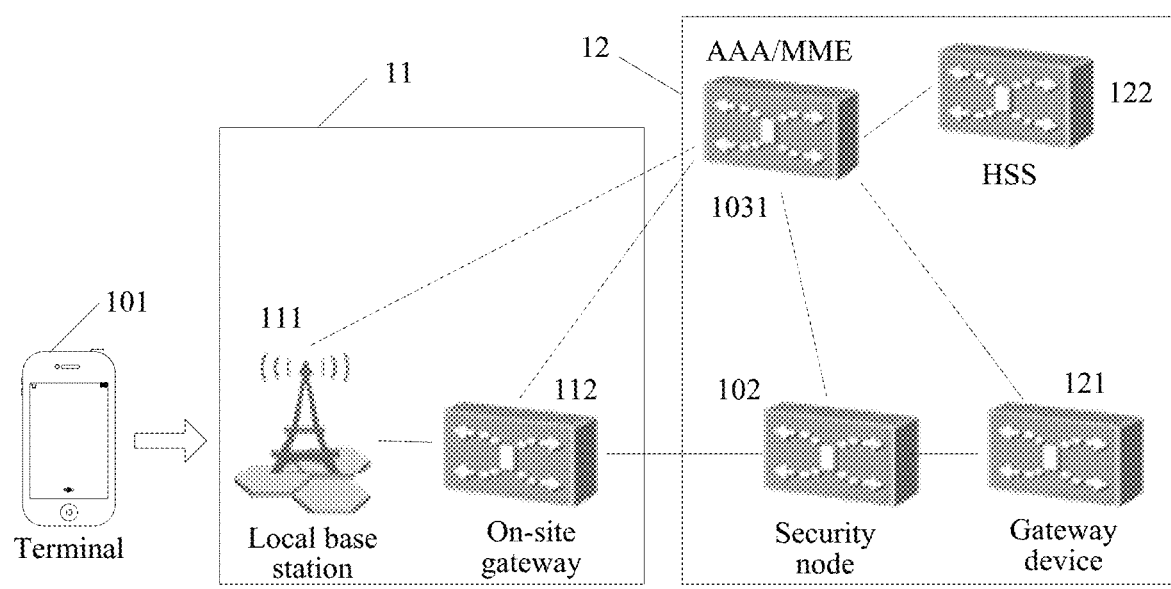
FIG. 1b is a schematic structural diagram of still another network architecture according to an embodiment of this application.

FIG. 1b is a schematic structural diagram of a network architecture of another mobile network according to an embodiment of this application. Referring to FIG. 1b, a difference between the network architecture and the network architecture shown in FIG. 1a is that a network element 11 of a local network does not include a network element of an local MME 113. An AAA/MME 1031 in a network element 12 of a public network replaces the local MME and is responsible for completing access management, session management, mobility management, and the like inside the local network.

Persons of ordinary skills in the art may understand that the structures shown in FIG. 1a and FIG. 1b are merely schematic, and do not constitute any limitation to the structure of the network architecture. For example, the network architecture may further include more or less network elements than those shown in FIG. 1a and FIG. 1b, or have a configuration different from those shown in FIG. 1a and FIG. 1b.

It should be noted that the network architectures shown in FIG. 1a and FIG. 1b are merely examples. In addition to the SALTE in the foregoing mobile network, the network architecture used in this embodiment of this application may alternatively be a Long Term Evolution LTE network, a non-3GPP network (for example, a mobile network accessed by using Wi-Fi), a Home NodeB network, a Global System for Mobile Communications GSM network, a Wideband Code Division Multiple Access WCDMA network, a network architecture in a future mobile network, a MulteFire network, or the like. For another network architecture having a structure similar to that in FIG. 1 is applicable to this embodiment of this application, and the used network architecture is not specifically limited in this embodiment of this application.

Figure 2:
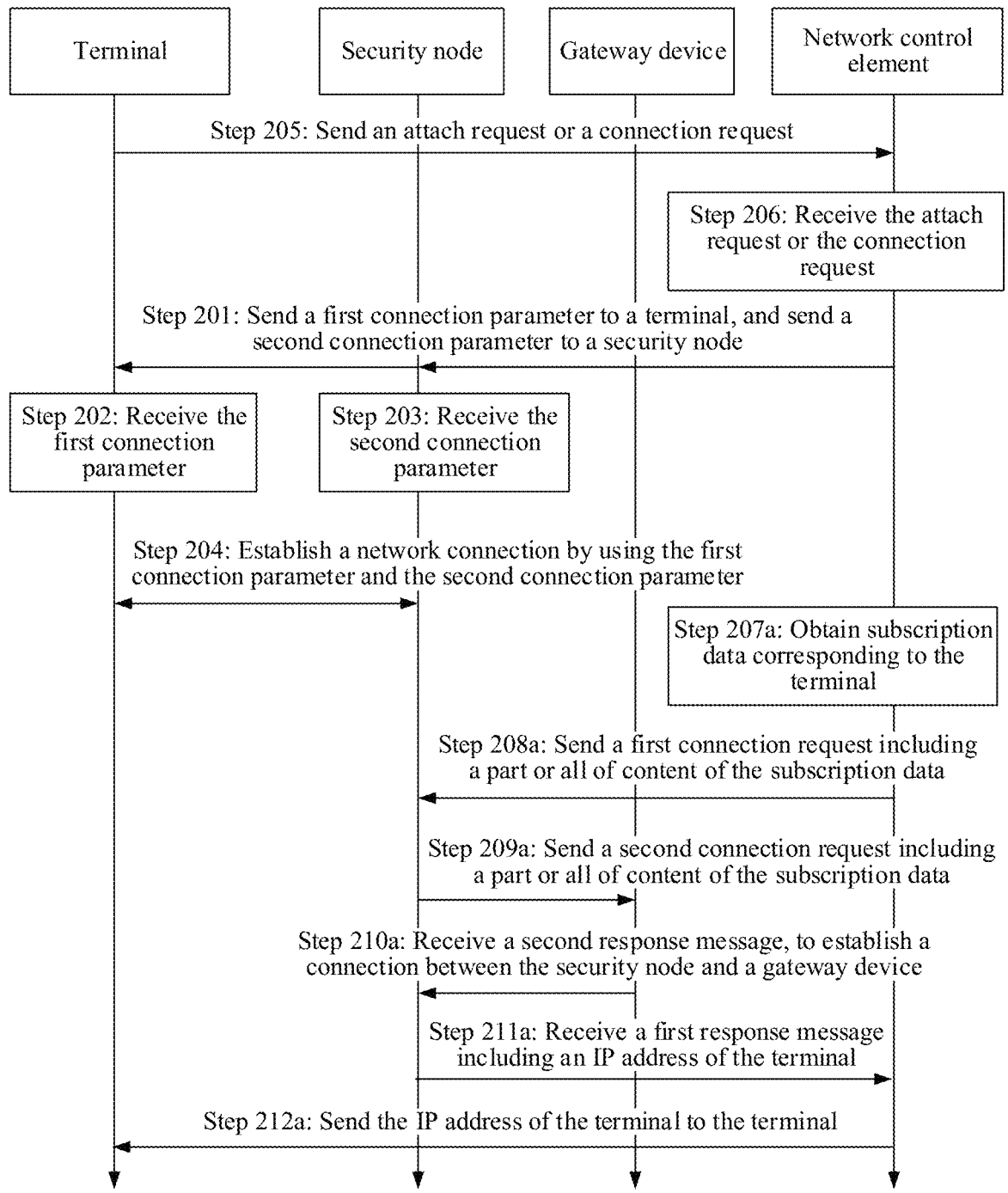
FIG. 2 is a schematic flowchart of a first network connection method according to an embodiment of this application.

FIG. 2 is a schematic flowchart of a network connection method according to an embodiment of this application. Referring to FIG. 2, the method includes the following steps.

Step 201: A network control element sends a first connection parameter to a terminal, and sends a second connection parameter to a security node, so that the terminal and the security node establish a network connection by using the first connection parameter and the second connection parameter. The first connection parameter is used for decrypting data encrypted by using the second connection parameter. Correspondingly, the second connection parameter is used for decrypting data encrypted by using the first connection parameter. The first connection parameter and the second connection parameter each include a security parameter used when the terminal and the security node establish the network connection.

In this embodiment of this application, the network control element may send the first connection parameter to the terminal and send the second connection parameter to the security node in an attach process or a connection establishment process. That is, the network connection can be established between the terminal and the security node in both the attach process and the connection establishment process. During actual application, the attach process not only includes a process of establishing the network connection, and but also may include a process of authentication and authorization between the terminal and a network device. In addition, the process of authentication and authorization between the terminal and the network device is consistent with that in the prior art. For details, refer to related technologies. Details are not described in this embodiment of this application.

It should be noted that when the network control element sends the first connection parameter to the terminal and sends the second connection parameter to the security node, there is no sequential order. That is, the network control element may first send the first connection parameter to the terminal and then send the second connection parameter to the security node, or may first send the second connection parameter to the security node and then send the first connection parameter to the terminal, certainly, or may simultaneous send the first connection parameter to the terminal and send the second connection parameter to the security node. This is not limited in this embodiment of this application.

Optionally, the network control element may be a mobility management entity MME, or an authentication, authorization, and accounting server AAA server, and may be briefly referred to as an AAA/MME. Certainly, during actual application, the network control element may alternatively be another network element. This is not limited in this embodiment of this application.

When the network control element is a mobility management entity, a local network has a more close relationship with a carrier network, and an operator can control operation of the local network better. When the network control element is an authentication, authorization, and accounting server, a local network has a less close relationship with a carrier network, and deployment of the local network is more flexible.

Optionally, in a network architecture, the security node may be an independent network element, or may be a network element integrated and deployed with a gateway device, or a network element integrated and deployed with a mobile edge computing (MEC) device, or may be integrated and deployed with a network element of another core network. This is not limited in this embodiment of this application.

When the security node is an independent network element, network device functions are more modularized, and a structure is clearer, but transport signaling between devices is increased. On the contrary, when the security node and the gateway device are integrated and deployed, network device functions are complex and diversified, but transport signaling between devices is reduced.

Further, optionally, before step 201, the network control element may further determine a node identifier of the security node based on home domain information of the terminal, and/or location information of the terminal, and/or location information of a local network in which the terminal is located, and send the node identifier of the security node to the terminal, so that the terminal determines the security node by using the identifier of the security node, and establishes the network connection to the security node by using the first connection parameter.

Specifically, when selecting, from a plurality of security nodes based on the home domain information of the terminal, and/or the location information of the terminal, and/or the location information of the local network in which the terminal is located, and the like, one security node that is relatively close to a user of the terminal, the network control element may send a node identifier of the selected security node to the terminal, so that the terminal determines the security node based on the node identifier, and establishes the network connection to the security node.

Step 202: The terminal receives the first connection parameter sent by the network control element. The first connection parameter is used for decrypting data encrypted by using the second connection parameter, and the first connection parameter includes the security parameter used when the terminal establishes the network connection to the security node.

The first connection parameter includes at least one of the following: a first security key, a security encryption algorithm, a randomizer, and a security index. That is, the first connection parameter may include one or more of the first security key, the security encryption algorithm, the randomizer, and the security index; and the security encryption algorithm, the randomizer, and the security index in the first connection parameter are consistent with those in the second connection parameter.

Specifically, the first security key is used by the terminal to encrypt sent data or decrypt received data, or is used for generating a new security key of the terminal. The security encryption algorithm is an algorithm used by the terminal to encrypt or decrypt data. The randomizer is used for generating a new security key. That is, the terminal may generate a new security key by using the randomizer, then the terminal may encrypt the sent data or decrypt the received by using the new security key. The security index is used for identifying one secure connection corresponding to a data packet. That is, the terminal may have a plurality of secure connections, and the terminal needs to determine, by using the security index, one secure connection corresponding to the security node, to send and receive the data packet by using the secure connection.

Step 203: The security node receives the second connection parameter sent by the network control element. The second connection parameter is used for decrypting data encrypted by using the first connection parameter, and the second connection parameter includes the security parameter used when the security node establishes the network connection to the terminal.

The second connection parameter includes at least one of the following: a second security key, a security encryption algorithm, a randomizer, and a security index. That is, the second connection parameter may include one or more of the second security key, the security encryption algorithm, the randomizer, and the security index; and the security encryption algorithm, the randomizer, and the security index in the second connection parameter are consistent with those in the first connection parameter.

Specifically, the second security key is used by the security node to encrypt sent data or decrypt received data, or is used for generating a new security key of the security node. The security encryption algorithm is an algorithm used by the security node to encrypt or decrypt data. The randomizer is used for generating a new security key. That is, the security node may generate a new security key by using the randomizer, and then the security node may encrypt the sent data or decrypt the received by using the new security key. The security index is used for identifying one secure connection corresponding to a data packet. That is, the security node may have a plurality of secure connections, and the security node needs to determine, by using the security index, one secure connection corresponding to the security node, to send and receive the data packet by using the secure connection.

Step 204: The terminal and the security node establish the network connection by using the first connection parameter and the second connection parameter.

In the attach process or connection establishment process, after the terminal receives the first connection parameter and the security node receives the second connection parameter, the terminal may encrypt the sent data by using the first security key, or the new security key generated by using the first security key, or the new security key generated by using the randomizer, and the security encryption algorithm, to obtain an encrypted data packet. The terminal identifies a secure connection corresponding to the data packet by using the security index, and sends the data packet to the security node by using the secure connection. When receiving a data packet sent by the security node, the terminal may identify a corresponding secure connection by using the security index, receive, by using the secure connection, the data packet sent by the security node, and decrypt the received data packet by using the first security key, or the new security key generated by using the first security key, or the new security key generated by using the randomizer, and the security encryption algorithm, to obtain data sent by the security node. Similarly, the security node may encrypt sent data or decrypt received data by using at least one of the second security key, the security encryption algorithm, the randomizer, and the security index that are included in the second connection parameter. A specific process is consistent with that of the terminal. Details are not described in this embodiment of this application again.

In this embodiment of this application, the terminal and the security node establish a secure network connection by using the first connection parameter and the second connection parameter. This can ensure that data is invisible to an intermediate node in a transmission process, thereby ensuring security of the data in the transmission process.

It should be noted that when sending and receiving data, the terminal and the security node usually need to use the security key, the security encryption algorithm, and the security index to perform encryption or decryption. The security key may be a first security key, or a second security key, or a new key generated by using the security key, or may be a security key generated by using the randomizer.

During specific implementation, the first connection parameter and the second connection parameter may include all parameters of the security key, the security encryption algorithm, and the security index, or include some parameters of the security key, the security encryption algorithm, and the security index.

When the first connection parameter includes all the parameters, the terminal may directly encrypt or decrypt data based on all the parameters. When the first connection parameter includes only some parameters, a parameter missing in the first connection parameter may be configured or specified in advance. The terminal can also obtain all the parameters, and encrypt or decrypt data based on all the parameters. A specific implementation is not limited in this embodiment of this application.

Similarly, when the second connection parameter includes all the parameters, the security node may directly encrypt or decrypt data based on all the parameters. When the second connection parameter includes only some parameters, a parameter missing in the second connection parameter may be configured or specified in advance. The security node can also obtain all the parameters, and encrypt or decrypt data based on all the parameters. A specific implementation is not limited in this embodiment of this application.

Optionally, before step 201, the method further includes step 205 and step 206.

Step 205: The terminal sends an attach request or a connection request to the network control element. The attach request or the connection request is used for requesting to establish a PDN (Public Data Network) connection.

Before the network control element sends, to the terminal and the security node, the security parameter used for establishing the network connection, the terminal may send, to the network control element, the attach request or the connection request used for requesting to establish the PDN connection. After receiving the attach request or the connection request, the network control element establishes the network connection between the terminal and the security node. The PDN connection is a default bearer established between the terminal and a packet data network.

A process in which the terminal sends the attach request or the connection request to the network control element is related to a structure of the network architecture. Using a network architecture of a mobile network as an example, if the network architecture is shown in FIG. 1a and FIG. 1b, the terminal may first send the attach request or the connection request to a network element of a local network, and then the network element of the local network forwards the attach request or the connection request to the network control element.

Specifically, in the network architecture shown in FIG. 1a, the terminal sends the attach request or the connection request to a local base station. When receiving the attach request or the connection request, the local base station sends the attach request or the connection request to an local MME. The local MME sends the attach request or the connection request to the network control element.

In the network architecture shown in FIG. 1b, the terminal sends the attach request or the connection request to a local base station. When receiving the attach request or the connection request, the local base station directly sends the attach request or the connection request to the network control element.

In this embodiment of this application, the attach request or the connection request both can be used for requesting to establish the PDN connection. During actual application, the attach request is used not only for requesting to establish the PDN connection, and but also for requesting a process of authentication and authorization between the terminal and a network deice. In addition, the process of authentication and authorization between the terminal and the network deice is consistent with that in the prior art. For details, refer to related technologies. Details are not described in this embodiment of this application.

Step 206: The network control element receives the attach request or the connection request sent by the terminal.

Specifically, the network control element receives the attach request or the connection request sent by the terminal. In the network architecture shown in FIG. 1a, this means that the network control element receives the attach request or the connection request forwarded by the local MME; and in the network architecture shown in FIG. 1b, this means that the network control element receives the attach request or the connection request forwarded by the local base station.

Further, after the network connection is established between the terminal and the security node, if the security node an independently deployed network element, a connection may further be established between the security node and the gateway device. In addition, depending on whether control plane communication can be directly performed between the security node and the gateway device, there are several different establishment methods. Details are as follows.

A first method: Control plane communication can be directly performed between the security node and the gateway device. After step 203, the method further includes step 207a to step 210a.

Step 207a: The network control element obtains subscription data corresponding to the terminal.

When obtaining the subscription data corresponding to the terminal, the network control element may send a subscription data request to an HSS. The subscription data request includes an identifier of the terminal. When receiving the subscription data request, the HSS may send the subscription data corresponding to the identifier of the terminal to the network control element.

The subscription data includes a service parameter of the terminal in the network. For example, the subscription data may include a charging characteristic, a QoS file of EPS (evolved packet system) subscription, and the like. Details are not described in this embodiment of this application.

Step 208a: The network control element sends a first connection request including a part or all of content of the subscription data to the security node.

When obtaining the subscription data corresponding to the terminal, the network control element may send the first connection request including a part or all of content of the subscription data to the security node. Certainly, the first connection request may further include the identifier of the terminal, and the identifier of the terminal is used for indicating that the subscription data is the subscription data corresponding to the terminal.

Step 209a: When receiving the first connection request, the security node sends a second connection request including a part or all of content of the subscription data to the gateway device. The second connection request is used for requesting to establish the connection between the security node and the gateway device.

When the security node receives the first connection request, that is, the security node receives a part or all of content of the subscription data, the security node may send the second connection request including a part or all of content of the subscription data to the gateway device. Certainly, during actual application, the second connection request may further include information such as the identifier of the terminal, for example, an IMSI and a GUTI, and an address of the security node. This is not limited in this embodiment of this application.

Step 210a: The security node receives a second response message sent by the gateway device, to establish the connection between the security node and the gateway device.

After the security node sends the second connection request to the gateway device, the gateway device may return the second response message to the security node, to establish the connection between the security node and the gateway device. This may alternatively be described as establishing a tunnel between the security node and the gateway device. During actual application, the second response message may include information such as an address of the gateway device and a QoS application parameter.

Further, the second response message further includes an IP address assigned by the gateway device to the terminal. Correspondingly, the method further includes step 211a and step 212a.

Step 211a: The network control element receives a first response message sent by the security node. The first response message includes an IP address of the terminal.

Step 212a: The network control element sends the IP address of the terminal to the terminal.

Specifically, when receiving the second response message including the IP address of the terminal, the security node sends the first response message including the IP address of the terminal to the network control element, so that the network control element sends the IP address of the terminal to the terminal. The terminal receives the IP address, so that the gateway device configures the IP address for the terminal.

Figure 3:
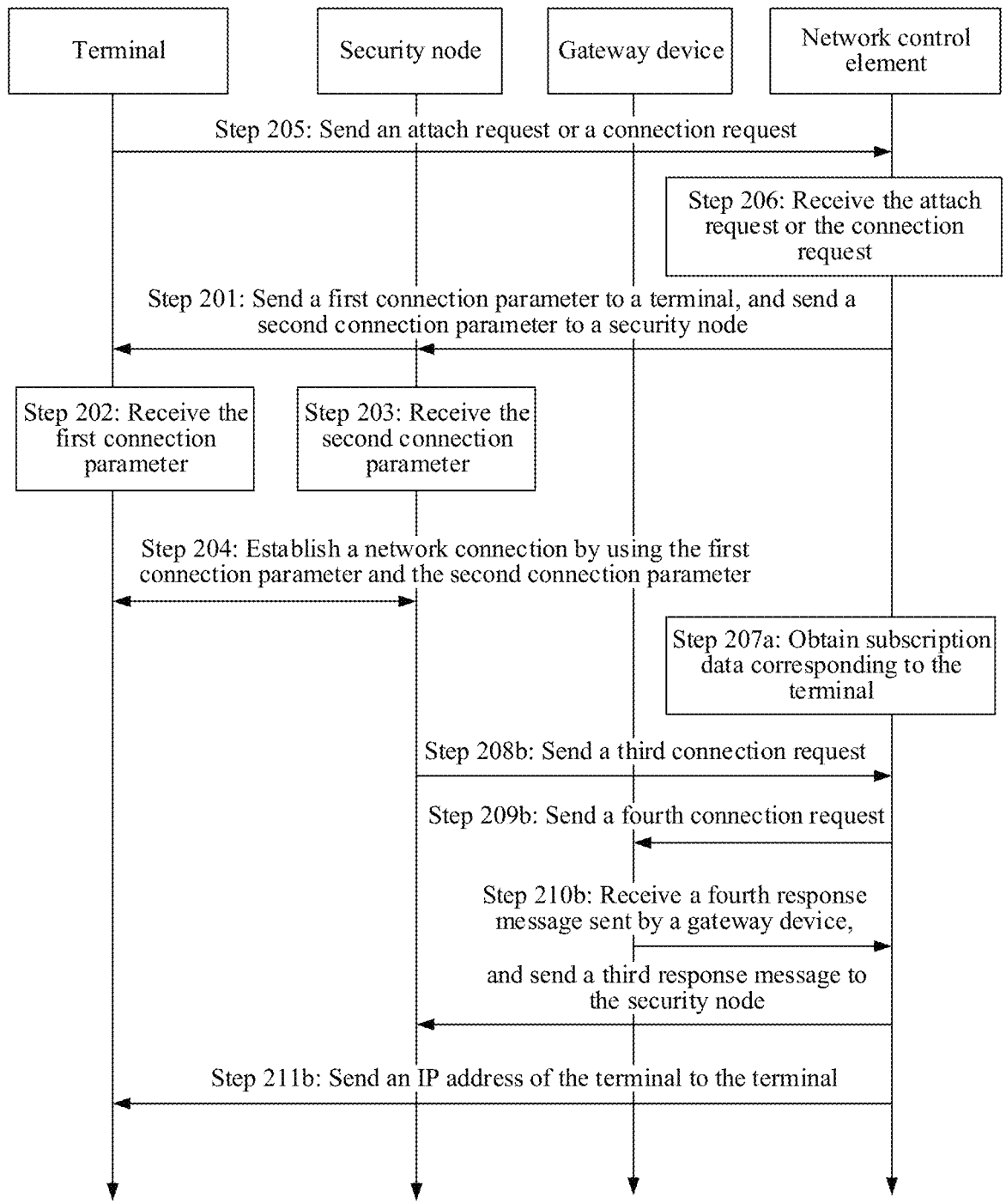
FIG. 3 is a schematic flowchart of a second network connection method according to an embodiment of this application.

A second method: Control plane communication cannot be directly performed between the security node and the gateway device. Referring to FIG. 3, after step 203, the method further includes step 207b to step 210b.

Step 207b: The network control element obtains subscription data corresponding to the terminal.

Step 207b is consistent with step 207a. For details, refer to the description of step 207a. Details are not described in this embodiment of this application again.

Step 208b: The security node sends a third connection request to the network control element. The third connection request is used for establishing the connection between the security node and the gateway device.

Because the security node cannot directly perform control plane communication with the gateway device, when the security node requests to establish the connection between the security node and the gateway device, the security node may send the third connection request to the network control element, so that the network control element sends a fourth connection request to the gateway device. The third connection request and the fourth connection request may include information such as an identifier of the terminal, for example, an IMSI and a GUTI, and an address of the security node.

Step 209b: When receiving the third connection request, the network control element sends a fourth connection request to the gateway device. The fourth connection request includes a part or all of content of the subscription data, and the third connection request and the fourth connection request are used for establishing the connection between the security node and the gateway device.

Step 210b: The network control element receives a fourth response message sent by the gateway device, and sends a third response message to the security node. The third response message includes a part or all of content of the subscription data.

When receiving the fourth connection request used for establishing the connection between the security node and the gateway device, the gateway device may send the fourth response message to the network control element. When receiving the fourth response message, the network control element may send the third response message to the security node, to establish the connection between the security node and the gateway device, where the third response message includes a part or all of content of the subscription data. During actual application, the fourth response message sent by the gateway device may further include information such as an address of the gateway device and a QoS application parameter.

Further, the fourth response message further includes an IP address assigned by the gateway device to the terminal. Correspondingly, the method further includes step 211b.

Step 211b: The network control element sends the IP address of the terminal to the terminal.

Specifically, when receiving the fourth response message that is sent by the gateway device and that includes the IP address of the terminal, the network control element obtains the IP address of the terminal from the fourth response message, and sends the IP address of the terminal to the terminal. The terminal receives the IP address.

Figure 4:
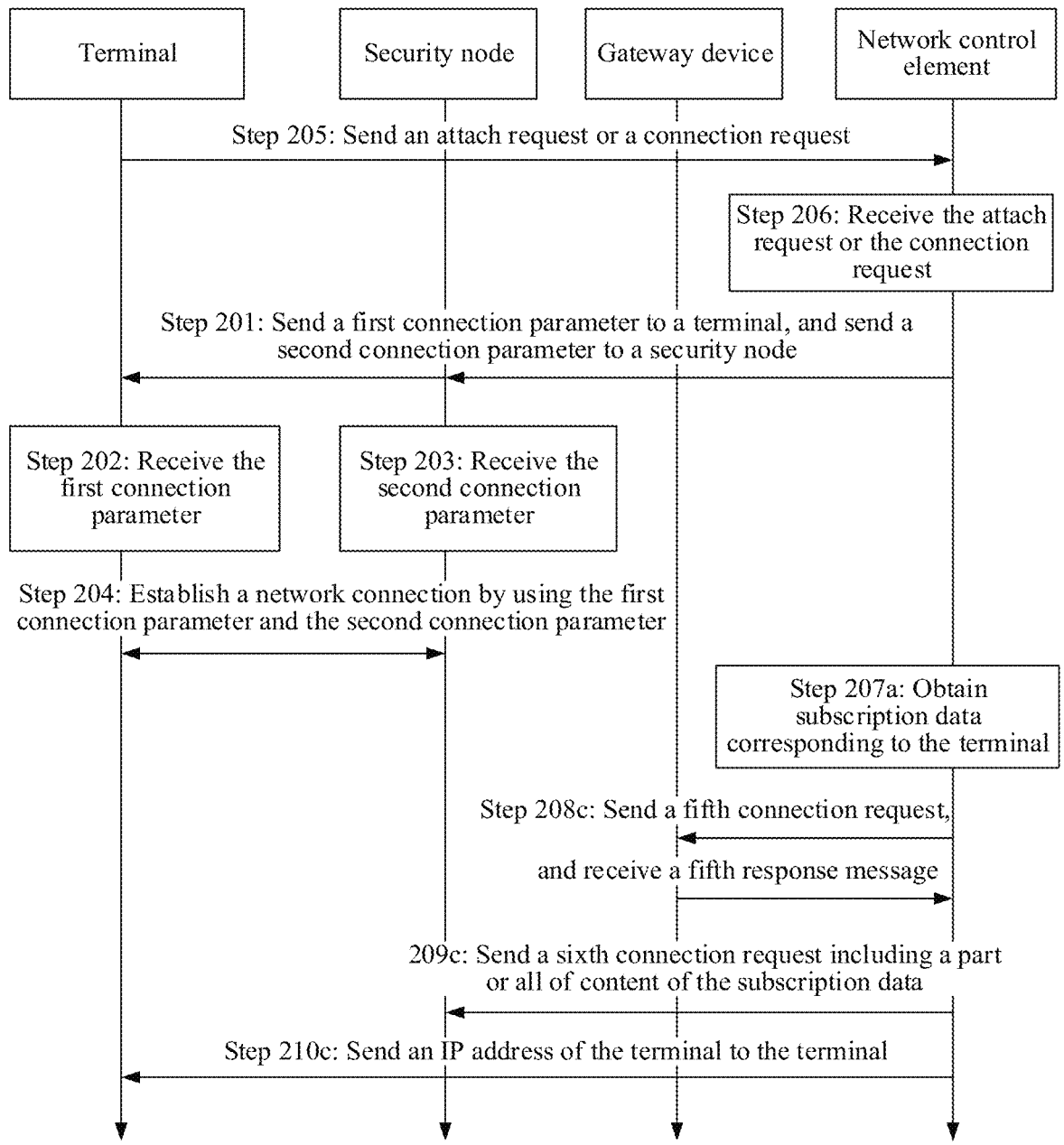
FIG. 4 is a schematic flowchart of a third network connection method according to an embodiment of this application.

A third method: Control plane communication cannot be directly performed between the security node and the gateway device. Referring to FIG. 4, after step 203, the method further includes step 207c to step 209c.

Step 207c: The network control element obtains subscription data corresponding to the terminal.

Step 207c is consistent with step 207a. For details, refer to the description of step 207a. Details are not described in this embodiment of this application again.

Step 208c: The network control element sends a fifth connection request including a part or all of content of the subscription data to the gateway device, so that the gateway device returns a fifth response message when receiving the fifth connection request.

The fifth connection request is used for requesting to establish the connection between the security node and the gateway device. When receiving the fifth connection request sent by the network control element, the gateway device may send the fifth response message to the network control element, to notify the network control element that the fifth connection request is successfully received. During actual application, the fifth connection request may further include an address of the security node, and the fifth response message may further include information such as an address of the gateway device and a QoS application parameter.

Step 209c: The network control element sends a sixth connection request including a part or all of content of the subscription data to the security node, to establish the connection between the security node and the gateway device.

After receiving the fifth response message sent by the gateway device, the network control element may send the sixth connection request including a part or all of content of the subscription data to the security node, to establish the connection between the security node and the gateway device. During actual application, the sixth connection request may further include information such as the address of the gateway device and the QoS application parameter.

Further, referring to FIG. 4, the fifth response message includes an IP address assigned by the gateway device to the terminal. Correspondingly, the method further includes step 210c.

Step 210c: The network control element sends the IP address of the terminal to the terminal.

Specifically, when receiving the fifth response message that is sent by the gateway device and that includes the IP address of the terminal, the network control element may obtain the IP address of the terminal from the fifth response message, and send the IP address of the terminal to the terminal. The terminal receives the IP address.

Correspondingly, if the fifth response message includes the IP address of the terminal, the network control element may further add the IP address of the terminal to the sixth connection request, to send the IP address of the terminal also to the security node.

It should be noted that a difference between the second method and the third method is that in the second method, the second connection request used for establishing the connection between the security node and the gateway device is sent by the security node, and is forwarded by the network control element to the gateway device; however, in the third method, the third connection request used for establishing the connection between the security node and the gateway device is directly sent by the network control element to the gateway device, and the security node does not need to send a connection request to the network control element, so that signaling interaction between the security node and the network control element is reduced by one time.

According to the network connection method provided in this embodiment of this application, the network control element assigns a pair of security parameters to the terminal and the security node to mutually encrypt and decrypt data, so that the terminal and the security node establish the network connection by using the assigned security parameters and perform data transmission. Therefore, the terminal and the security node do not need to determine the security parameters through negotiation by performing complex signaling interaction. In addition, to establish the connection between the security node and the gateway device, several different connection methods are provided. Meanwhile, the gateway device has configured the IP address for the terminal in the connection process, thereby simplifying a network connection process, and increasing a speed of network connection establishment.

It should be noted that in a method for establishing a secure network connection in the prior art, the security node is selected by the terminal. Because the terminal has no sufficient information, a security node selected by the terminal may not be an optimal security node. Consequently, a delay of data transmission is relatively long. For this problem, this application further provides a method for determining a security node.

Figure 5:
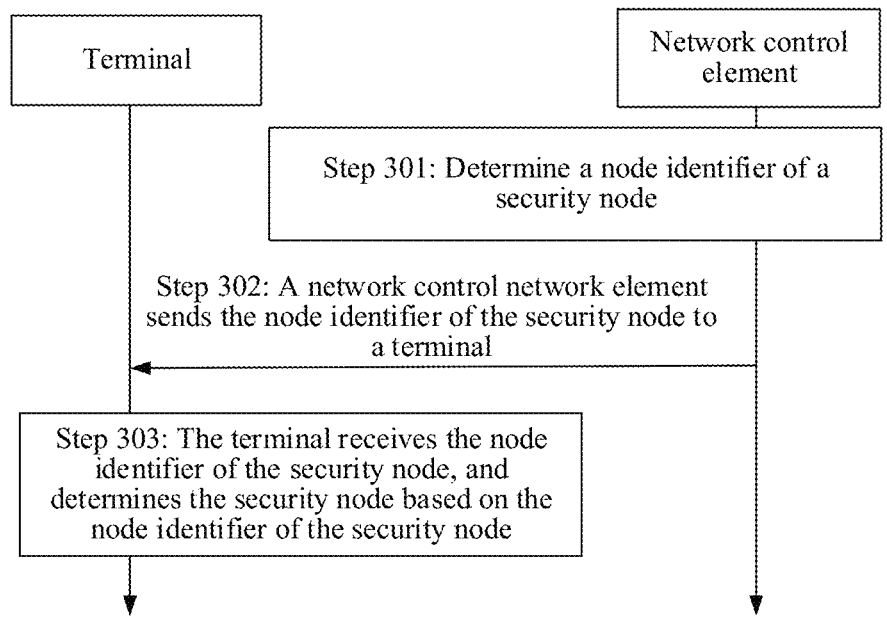
FIG. 5 is a schematic flowchart of a method for determining a security node according to an embodiment of this application.

FIG. 5 shows a method for determining a security node according to an embodiment of this application. Referring to FIG. 5, the method includes the following steps.

Step 301: A network control element determines a node identifier of a security node based on home domain information of a terminal, and/or location information of the terminal, and/or location information of a local network in which the terminal is located.

Optionally, the network control element selects one security node from a plurality of security nodes based on the home domain information of the terminal, and/or the location information of the terminal, and/or the location information of the local network in which the terminal is located, and determines an identifier of the selected security node as the node identifier of the security node. That is, the network control element may select one security node from a plurality of security nodes included in a network based on any one, two, or all pieces of the home domain information of the terminal, the location information of the terminal, and the location information of the local network in which the terminal is located, and determines an identifier of the selected security node as the node identifier of the security node.

Specifically, when selecting one security node from a plurality of the security nodes, the network control element usually may select, based on at least one piece of the home domain information, the location information of the terminal, and the location information of the local network in which the terminal is located, one security node that is relatively close to the terminal, and determine an identifier of the selected security node as the node identifier of the security node. In this way, paths for control plane signaling and user plane transmission can be reduced, thereby reducing a transmission delay.

The home domain information of the terminal may be determined by using a home domain identity of the terminal. If a home domain of the terminal is a home domain identity of an operator, the home domain identity may be an international mobile subscriber identity IMSI or a globally unique temporary identity GUTI. If a home domain of the terminal is not a home domain identity of an operator, the home domain identity may be a subscriber identity SI (Subscriber Identifier). Certainly, during actual application, the home domain identity may some other identities, so that the network control element may determine the home domain information of the terminal based on the home domain identity of the terminal.

The location information of the terminal may be longitude and latitude information of the terminal, or coordinate information, or an identifier and/or location information of an access network of the terminal. For example, in a mobile network, the access network may be a base station. When the location information of the terminal is an identifier of the base station in the access network, the network control element may determine location information of the base station based on the identifier of the base station.

The location information of the local network may be an identifier and/or location information of a management network element in the local network or an identifier and/or location information of an access network. For example, in the mobile network, the management network element may be an local MME, and the access network may be a base station. When the location information of the local network is the identifier of the management network element or the identifier of the access network, the network control element may determine the location information of the local network based on the identifier.

Further, when obtaining the home domain information of the terminal, the network control element may determine the home domain information of the terminal by receiving the home domain identity of the terminal; or first determine the home domain identity of the terminal based on a received identifier of the terminal in the local network, and then determine the home domain information of the terminal based on the home domain identity. When obtaining the location information of the terminal, the network control element may receive location information reported by the terminal, or determine the location information of the terminal based on a received message of the access network, for example, a message of the base station. When obtaining the location information of the local network, the network control element may receive location information reported by a network element in the local network, or determine the location information of the local network based on a received message of the local network.

Optionally, the terminal sends an attach request or a connection request to the network control element. The attach request or the connection request includes the home domain identity of the terminal and/or the location information of the terminal. In addition, when the attach request or the connection request passes through the access network and the network element in the local network, the access network and the network element in the local network may add the identifier or the location information of the access network and the identifier or the location information of the local network to the attach request or the connection request. For example, in the network architecture shown in FIG. 1a, the attach request or the connection request passes through the local base station and the local MME in the network and arrives at the network control element. The local base station and the local MME may add identifiers or location information thereof to the attach request or the connection request and send the attach request or the connection request to the network control element. In the network architecture shown in FIG. 1b, the attach request or the connection request passes through only the local base station, the local base station may add an identifier or location information of the base station to the attach request or the connection request and send the attach request or the connection request to the network control element, so that the network control element may obtain the location information of the terminal and the location information of the local network.

Step 302: The network control element sends the node identifier of the security node to the terminal.

Step 303: The terminal receives the node identifier of the security node sent by the network control element, and determines the security node based on the node identifier of the security node.

Specifically, when determining the node identifier of the security node, the network control element may send the node identifier of the security node to the terminal. When receiving the node identifier of the security node, the terminal determines the security node based on the node identifier of the security node, so that a network connection is established between the terminal and the security node based on the foregoing network connection method.

According to the method for determining a security node provided in this embodiment of this application, the network control element selects, based on the home domain information of the terminal, the location information of the terminal, and/or the location information of the local network, and the like, a security node that is relatively close to the terminal, and sends a node identifier of the security node to the terminal, so that the terminal establishes the network connection to the security node. In this way, when the terminal and the security node perform data transmission, paths for control plane signaling and user plane transmission may be reduced, thereby reducing a transmission delay.

Figure 6:
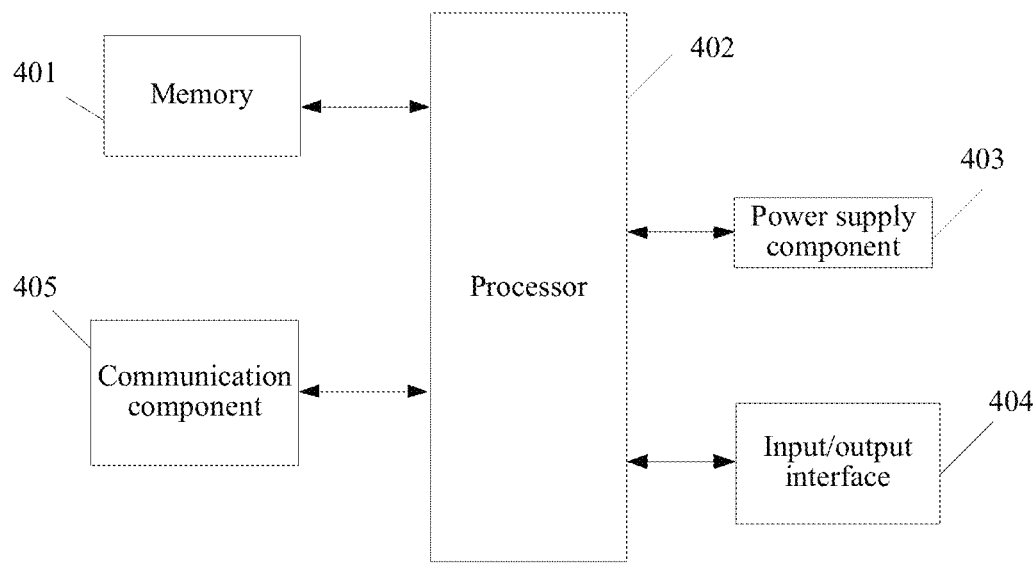
FIG. 6 is a schematic structural diagram of a network element according to an embodiment of this application.

FIG. 6 shows a network element according to an embodiment of this application. The network element may be a network control element, or may be a terminal, or may be a security node. The network element includes a memory 401, a processor 402, a power supply component 403, an input/output interface 404, a communications component 405, and the like. Persons of ordinary skills in the art may understand that a structure shown in FIG. 6 is merely schematic, and does not constitute any limitation to the structure of the network element. For example, the network element may further include more or less components than those shown in FIG. 6, or have a configuration different from that shown in FIG. 6.

Each component in the network element is described in detail below:

The memory 401 may be configured to store data, and a software program and module, and mainly include a program storage area and a data storage area. The program storage area may store an operating system, an application program required by at least one function, and the like. The data storage area may store data created based on use of a model parameter fusion apparatus. In addition, the memory may include a high-speed random access memory, and may further include a non-volatile memory such as at least one magnetic disk storage component, a flash memory component, or another volatile solid-state storage component.

The processor 402 is a control center of the network element, connects all parts of the entire network element through various interfaces and lines, and performs various functions and processes data by running or executing the software program and/or module stored in the memory 401 and by invoking the data stored in the memory 401, to monitor the entire network element. Optionally, the processor 402 may include one or more processing units. Preferably, the processor 402 may integrate an application processor and a modem processor. The application processor mainly processes an operating system, a user interface, an application program, and the like. The modem processor mainly processes wireless communication. It may be understood that the modem processor may alternatively not be integrated into the processor 402.

The power supply component 403 is configured to supply power to each component of the network element. The power supply component 403 may include a power management system, one or more power supplies, and another component related to generation, management, and power distribution of the network element.

The input output interface 404 provides an interface between the processor 402 and a peripheral interface module. For example, the peripheral interface may be a keyboard, a mouse, or the like.

The communications component 405 is configured to facilitate communication between the network element and another device in a wired or wireless manner. The network element may access a communication standard-based wireless network such as Wi-Fi, 2G, or 3G, or a combination thereof.

Although not shown in the figure, the network element may further include an audio component, a multimedia component, and the like. Details are not described in this embodiment of this application.

Optionally, when the processor 402 runs code in the memory 401, to enable the network element to perform steps of a network control element in the network connection methods shown in FIG. 2 to FIG. 4, the network control element is configured to:

send a first connection parameter to a terminal; and send a second connection parameter to a security node, where the first connection parameter is used for decrypting data encrypted by using the second connection parameter; correspondingly, the second connection parameter is used for decrypting data encrypted by using the first connection parameter; and the first connection parameter and the second connection parameter each include a security parameter used when the terminal and the security node establish a network connection.

Optionally, when the processor 402 runs code in the memory 401, to enable the network element to perform steps of a terminal in the network connection methods shown in FIG. 2 to FIG. 4, the terminal is configured to:

receive a first connection parameter sent by a network control element, where the first connection parameter is used for decrypting data encrypted by using a second connection parameter, and the first connection parameter includes a security parameter used when the terminal establishes a network connection to a security node; and establish, by using the first connection parameter, the network connection to the security node receiving the second connection parameter.

Optionally, when the processor 402 runs code in the memory 401, to enable the network element to perform steps of a security node in the network connection methods shown in FIG. 2 to FIG. 4, the security node is configured to:

receive a second connection parameter sent by a network control element, where the second connection parameter is used for decrypting data encrypted by using a first connection parameter, and the second connection parameter includes a security parameter used when the security node establishes a network connection to a terminal; and establish, by using the second connection parameter, the network connection to the terminal receiving the first connection parameter.

Specifically, when the network control element, the terminal, and the security node are configured to perform the network connection methods shown in FIG. 2 to FIG. 4, refer to the descriptions in the embodiments corresponding to FIG. 2 to FIG. 4 for details of the network connection methods. Details are not described in this embodiment of this application again.

According to the network element provided in this embodiment of this application, when the network element is configured to perform steps of the network control element in the network connection methods shown in FIG. 2 to FIG. 4, the network control element sends the first connection parameter to the terminal, and sends the second connection parameter to the security node, where the first connection parameter is used for decrypting data encrypted by using the second connection parameter, and the second connection parameter is used for decrypting data encrypted by using the first connection parameter, so that the terminal and the security node may directly establish the network connection by using the first connection parameter and the second connection parameter, and the terminal and the security node do not need to determine the security parameter through negotiation by performing complex signaling interaction, thereby simplifying a network connection process.

Optionally, when the processor 402 runs code in the memory 401, to enable the network element to perform steps of a network control element in the method for determining a security node shown in FIG. 5, the network control element is configured to:

determine a node identifier of a security node based on home domain information of a terminal, and/or location information of the terminal, and/or location information of a local network in which the terminal is located; and send the node identifier of the security node to the terminal, so that the terminal determines the security node by using the node identifier of the security node.

Optionally, when the processor 402 runs code in the memory 401, to enable the network element to perform steps of a terminal in the method for determining a security node shown in FIG. 5, the terminal is configured to:

receive the node identifier of the security node sent by the network control element; and determine the security node based on the node identifier of the security node.

Specifically, when the network control element and the terminal are configured to perform the method for determining a security node shown in FIG. 5, refer to the descriptions in the embodiment corresponding to FIG. 5 for details of the method for determining a security node. Details are not described in this embodiment of this application again.

According to the network element provided in this embodiment of this application, when the network element is configured to perform steps of the network control element in the method for determining a security node shown in FIG. 5, the network control element selects, based on the home domain information of the terminal, the location information of the terminal, the location information of the local network, and the like, a security node that is relatively close to the terminal, and sends a node identifier of the security node to the terminal, so that when the terminal and the security node perform data transmission, paths for control plane signaling and user plane transmission may be reduced, thereby reducing a transmission delay.

Finally, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, and such modifications or replacements do not cause the essence of corresponding technical solutions to depart from the scope of the technical solutions in the embodiments of this application.

What is claimed is:

1. A network connection method, comprising:
   sending, by a network control element, a first connection parameter to a terminal;
   sending, by the network control element, a second connection parameter to a security node;
   obtaining, by the network control element, subscription data corresponding to the terminal;
   sending, by the network control element, a first connection request comprising a part or all of content of the subscription data to the security node; and
   sending, by the security node, a second connection request comprising the part or all of content of the subscription data to a gateway device, enabling a connection to be established between the security node and the gateway device,
   wherein the first connection parameter is configured for decrypting data encrypted by using the second connection parameter, the second connection parameter is configured for decrypting data encrypted by using the first connection parameter, and the first connection parameter and the second connection parameter each comprise a security parameter used by the terminal and the security node to establish a network connection.

2. The method according to claim 1, wherein:
   the first connection parameter comprises at least one of the following:

a first security key, a security encryption algorithm, a randomizer, or a security index;

the second connection parameter comprises at least one of the following:

a second security key, the security encryption algorithm, the randomizer, or the security index;

the first security key enables the terminal to encrypt sent data or decrypt received data, or enables the generation of a new security key of the terminal;

the security encryption algorithm is an algorithm that enables the terminal or the security node to encrypt or decrypt data;

the randomizer enables generation of a new security key;

the security index enables identification of a secure connection corresponding to a data packet; and the second security key enables the security node to encrypt sent data or decrypt received data, or enables generation of a new security key of the security node.

3. The method according to claim 1, wherein the security node is an independent network element, and the security node directly sends the second connection request to the gateway device.

4. The method according to claim 3, further comprising:
receiving, by the network control element, a first response message sent by the security node, wherein the first response message comprises an IP address assigned by the gateway device to the terminal; and
sending, by the network control element, the IP address of the terminal to the terminal.

5. The method according to claim 1, wherein
the security node is an independent network element, and
the second connection request is sent by the security node to the gateway device through the network control element.

6. The method according to claim 5, further comprising:
receiving a third response message sent by the gateway device to the security node through the network control element; and
sending, by the network control element, a second response message to the security node,
wherein the second response message comprises the part or all of content of the subscription data.

7. The method according to claim 1, wherein before sending, by the network control element, the first connection parameter to the terminal, the method further comprises:
determining, by the network control element, a node identifier of the security node; and
sending, by the network control element, the node identifier of the security node to the terminal.

8. The method according to claim 1, wherein before sending, by the network control element, the first connection parameter to the terminal, the method further comprises:
receiving, by the network control element, an attach request or a connection request sent by the terminal, wherein the attach request or the connection request is used for requesting to establish a PDN connection, and the attach request or the connection request comprises home domain information of the terminal and/or location information of the terminal.

9. A network control element, comprising a memory and a processor, wherein the memory stores code and data, and the processor runs the code in the memory to enable the network control element to perform the following operations:
sending a first connection parameter to a terminal;
sending a second connection parameter to a security node;
obtaining subscription data corresponding to the terminal;
sending a first connection request comprising a part or all of content of the subscription data to the security node for enabling the security node to send a second connection request comprising the part or all of content of the subscription data to a gateway device, enabling a connection to be established between the security node and the gateway device,
wherein the first connection parameter is configured for decrypting data encrypted by using the second connection parameter, the second connection parameter is configured for decrypting data encrypted by using the first connection parameter, and the first connection parameter and the second connection parameter each comprise a security parameter used by the terminal and the security node to establish a network connection.

10. The network control element according to claim 9, wherein:
the first connection parameter comprises at least one of the following:
a first security key, a security encryption algorithm, a randomizer, or a security index;
the second connection parameter comprises at least one of the following:
a second security key, the security encryption algorithm, the randomizer, or the security index;
the first security key enables the terminal to encrypt sent data or decrypt received data, or enables the generation of a new security key of the terminal;
the security encryption algorithm is an algorithm that enables the terminal or the security node to encrypt or decrypt data;
the randomizer enables generation of a new security key;
the security index enables identification of a secure connection corresponding to a data packet; and
the second security key enables the security node to encrypt sent data or decrypt received data, or enables generation of a new security key of the security node.

11. The network control element according to claim 9, wherein the security node is an independent network element, and the first connection request enables the security node to directly send the second connection request to the gateway device.

12. The network control element according to claim 11, wherein the operations further comprise:
receiving a first response message sent by the security node, wherein the first response message comprises an IP address assigned by the gateway device to the terminal; and
sending the IP address of the terminal to the terminal.

13. The network control element according to claim 9, wherein the security node is an independent network element, and the operations further comprise:
facilitating sending of the second connection request sent by the security node to the gateway device by:
receiving a third connection request from the security node comprising the part or all of content of the subscription data; and
sending a fourth connection request to the gateway device, wherein the fourth connection request comprises the part or all of content of the subscription data.

14. The network control element according to claim 13, wherein the operations further comprise:
sending a second response message to the security node, wherein the second response message comprises the part or all of content of the subscription data based on a third response message received from the gateway device.

15. The network control element according to claim 9, wherein before sending the first connection parameter to the terminal, the operations further comprise:
  determining a node identifier of the security node; and
  sending the node identifier of the security node to the terminal.

16. The network control element according to claim 9, wherein before sending the first connection parameter to the terminal, the operations further comprise:
  receiving an attach request or a connection request sent by the terminal, wherein the attach request or the connection request is used for requesting to establish a PDN connection, and the attach request or the connection request comprises home domain information of the terminal and/or location information of the terminal.

* * * * *